United States Patent [19]

Foran, Jr. et al.

[11] Patent Number: 5,415,041
[45] Date of Patent: May 16, 1995

[54] DOUBLE HELICAL FLOWMETER

[75] Inventors: Charles D. Foran, Jr.; Charles D. Foran, Sr., both of Richardson, Tex.

[73] Assignee: Flowdata, Inc., Richardson, Tex.

[21] Appl. No.: 185,382

[22] Filed: Jan. 24, 1994

[51] Int. Cl.⁶ .............................. G01F 3/10
[52] U.S. Cl. .................................... 73/261
[58] Field of Search ................... 73/261; 418/202

[56] References Cited

U.S. PATENT DOCUMENTS

| | | | |
|---|---|---|---|
| 1,233,599 | 7/1917 | Nuebling. | |
| 2,079,083 | 5/1937 | Montelius. | |
| 2,319,374 | 5/1943 | Ungar | 418/202 |
| 2,611,323 | 9/1952 | Digney | 418/202 X |
| 2,756,684 | 7/1956 | Renzo | 418/202 |
| 2,982,221 | 5/1961 | Whitfield | 418/202 X |
| 4,210,410 | 7/1980 | Ohtani. | |
| 4,224,015 | 9/1980 | Nagata. | |
| 4,329,130 | 5/1982 | Nagata et al. | |
| 4,641,522 | 2/1987 | Lopresti | 73/261 |
| 5,184,519 | 2/1993 | Ciarelli et al. | |
| 5,269,668 | 12/1993 | Lew et al. | 73/253 X |

FOREIGN PATENT DOCUMENTS 540498 10/1941 United Kingdom .............. 418/202

Primary Examiner—Herbert Goldstein
Attorney, Agent, or Firm—James Creighton Wray

[57] ABSTRACT

A high volume, low RPM, low noise, low wear and long life flowmeter uses inter-engaging double helical four-lobe rotors. The meter is made with ball bearings or bearingless. The double helical nature of the teeth provides no axial loads and no side loads or end loads, and uses true gear designs with very large pockets. A high contact ratio is provided with only four teeth, reducing and eliminating noise and pulsing output, increasing working volume and decreasing speed and wear.

10 Claims, 2 Drawing Sheets

DOUBLE HELICAL FLOWMETER

BACKGROUND OF THE INVENTION

Flowmeters are widely used to measure rates of flow and delivery volumes of fluids.

In some positive displacement flowmeters tooth rotors are arranged on parallel axes within a sealed cavity. The rotors intermesh as fluid flows in one side, outward around both tooth rotors, and then out through an outlet. The volume of the spaces between the teeth are known, rotation of the rotors is sensed and volume and rate of flow may be determined.

Meshed helical rotors have been in use in flowmeters since at least as early as the beginning of the 20th century. However, no flowmeters have taken the unique form of the present invention.

The use of helical rotors in flowmeters has caused axial loading of the rotors, which tends to push the rotors toward one end of the housing in which they rotate. The axial loading of the rotors increases wear at the end of the housing, toward which the rotors are forced. Wear causes varied clearances at opposite ends of the housings. Changing clearances by axial force and wear changes flow-by characteristic of flowmeters and may adversely affect accuracy.

Periodic blocking of inlet ports and outlet ports causes pulsations which may reduce accuracy and which may create noise, vibrations and wear.

Needs exist for improved flowmeters with improved accuracy and wear characteristics and reduced noise.

SUMMARY OF THE INVENTION

The present invention solves problems existing in the prior art by providing double helical rotors in flowmeters.

Two double helical rotors are bearingless or are supported with anti-friction bearings. The double helical rotor flowmeters have advantages of high throughput at low RPM's while providing exceptional balance and long wear. The unique invention provides a flowmeter with no axial loads, no side loads and no end loads. Whereas straight gears and teeth are noisy and have low contact ratios, in the present invention more portions of the teeth are enmeshed substantially continuously, therefore providing a high contact ratio. The invention provides flowmeters with highly desirable high flow at low RPM's, which provides low wear, long life and low noise.

The high flow rates of the present invention provide low pressure drops so that the invention can be used equally with viscous and thin liquids, and potentially even with gases.

In its simplest form, the present invention provides simple double helical rotors and flowmeters. The rotors are bearingless or are mounted on bearings. Targets or magnets are placed in engineered thermoplastics rotor lobes. When metal teeth rotors are used, the teeth of the rotors themselves are targets for sensors. In preferred embodiments, sensors are screwed directly into the case or cover plate.

A high volume, low RPM, low noise, low wear and long life flowmeter uses inter-engaging double helical rotors, preferably with four lobes although greater or fewer numbers of double helical lobes may be used. The meter is made with anti-friction bearings or bearingless. The double helical nature of the teeth in the meter rotors provides no axial loads and no side loads or end loads, and uses gear designs with very large pockets. All axial loading is absorbed and balanced within the rotors. A high contact ratio is provided with a minimum number of two teeth, reducing and eliminating noise and pulsing output, increasing working volume and decreasing speed and wear. The large ports, in combination with the sloping helical lobes, provide continual flow through the ports which are not blocked by the tips of the lobes.

A preferred flowmeter apparatus has a case with a cavity. Intermeshing double helical rotors are mounted for rotation within the cavity. A cover closes the cavity and holds the rotors within the cavity. The cavity has an inlet at one end and an outlet at an opposite end for flowing fluid into the cavity through the inlet and around the meshing double helical rotors and out of the cavity through the outlet. A sensing device is mounted on the case for sensing rotation of the double helical rotors.

Each of the rotors has double helical lobes, and each of the rotors has large volume transfer pockets alternately in communication with the inlet port, in isolation from the inlet and outlet ports, and communication with the outlet port.

The transfer volume has curved surfaces which slope inward from axial outer surfaces of the rotors toward axial centers of the rotors.

The unique shape of the rotors provides large flow through the meters at low rotational speeds in quiet long wearing balanced meters.

These and further and other objects and features of the invention are apparent in the disclosure, which includes the above and ongoing written specification, with the claims and the drawings.

DETAILED DESCRIPTION OF THE DRAWINGS

Figure 1:
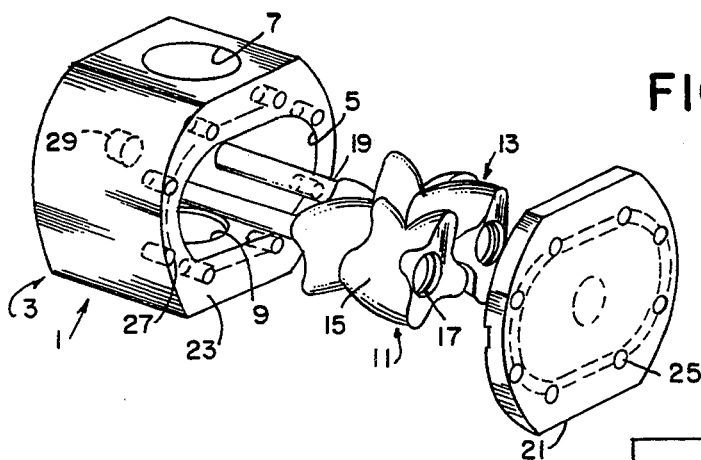
FIG. 1 is a perspective exploded view of one embodiment of the invention.

Referring to FIG. 1, a flowmeter 1 has a case 3 with a cavity 5. The cavity 5 has a large inlet 7 and a large outlet 9. Two intermeshing rotors 11 and 13, which have centrally directed double helical shaped lobes, fit within the cavity 5.

In the embodiment shown in FIG. 1, the double helical rotor 11 rotates in a counterclockwise direction, and the double helical rotor 13 rotates in a clockwise direction, while fluid flows in through opening 7, externally around the rotors in moving pockets, and out through opening 9. The fluid is carried in large pockets 15 in the outer surfaces of the rotors as the rotors rotate. Rounded portions of the chevron-shaped tips glide past the inlet and outlet, never covering the ports but always providing continuous flow into and out of the ports.

The rotors may have counter bores 17 at ends of axial openings for receiving press fitted bearings, which rotate on fixed parallel shafts 19. A cover 21 closes the cavity 5 by fitting on the machined face 23 of the case 3, and by being bolted in place with bolts which extend through openings 25 of the cover into aligned threaded receivers 27 in the case.

A magnetic pickup 29 is placed in a blind cavity in an outer wall of the case to sense passages of ends of the tips of the rotors 11 and 13, or to sense tips of one rotor.

Figure 2:
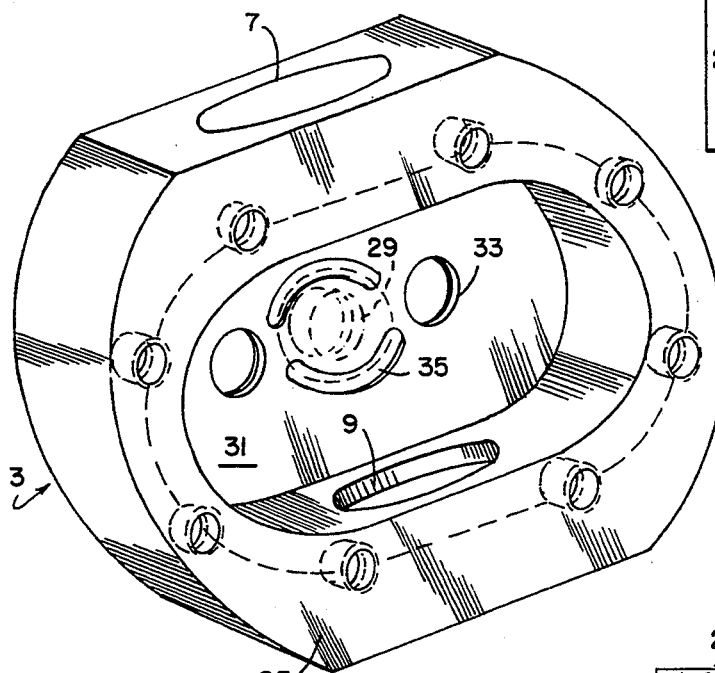
FIG. 2 is a perspective view of the case and cavity of the flowmeter shown in FIG. 1.

As shown in FIG. 2, the end wall 31 of the cavity 5 has blind bores 33 formed therein to receive and fix ends of shafts 19 on which the rotors rotate. Relief ports 35 may be formed in the wall 31 as shallow arcuate depressions to permit flow away from rotor tips and valleys as they mesh. The helical rotors may float within the case, controlled only by the fluid and by thin lands at axial ends of the rotors. Alternatively or in addition, the rotors may turn on short stub shafts fixed on flat surfaces of the case or cover which project into blind axial recesses in the rotors.

Figure 3:
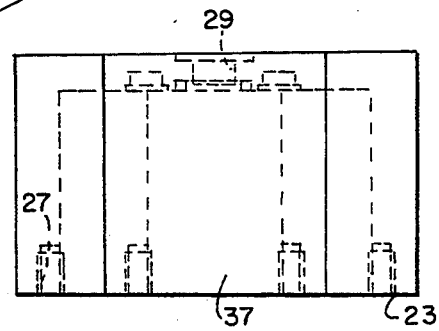
FIG. 3 is a top plan of the case and cavity.

FIG. 3 shows the inlet 7 in the side 37 of the meter cavity, and also shows the blind bore 29 which receives the rotor tip sensor. The threaded holes 27 receive cover-mounting bolts.

Figure 4:
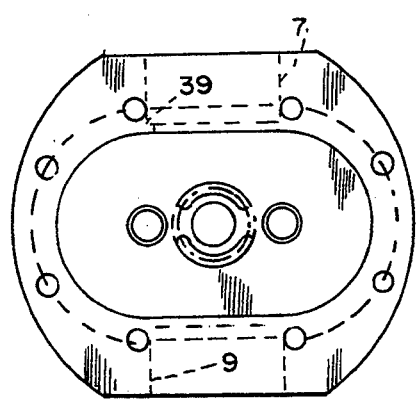
FIG. 4 is a side elevation of the case and cavity shown in FIGS. 1 and 2.

As shown in FIG. 4, the inlet 7 and outlet 9 are stepped to receive inlet and outlet pipes, which are abutted against ledges 39 to provide smooth interior flow into and out of the flowmeter 1.

Figure 6:
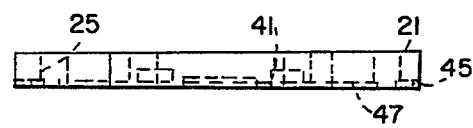
FIG. 6 is a top view of the cover.
Figure 7:
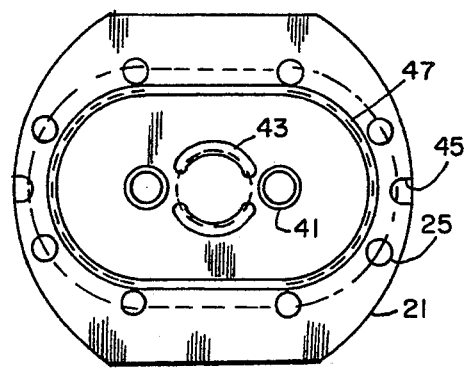
FIG. 7 is a side elevation of the cover.
Figure 5:
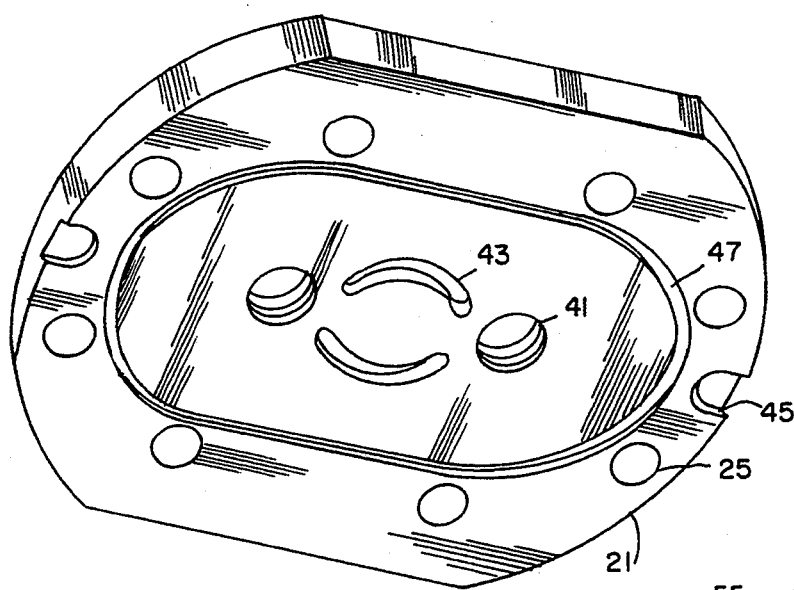
FIG. 5 is a perspective view of the cover.

The cover 21 shown in FIGS. 5, 6 and 7 has blind bores 41 which receive ends of fixed shaft 19, and shallow arcuate relief ports 43 which permit outward flow from the ends of the meshing rotors. Recesses 45 permit access for separating the cover from the case.

An O-ring gasket recess 47 is provided around the area which seals with the edge of surface 23 of the case 3 around the cavity 5.

Figure 8:
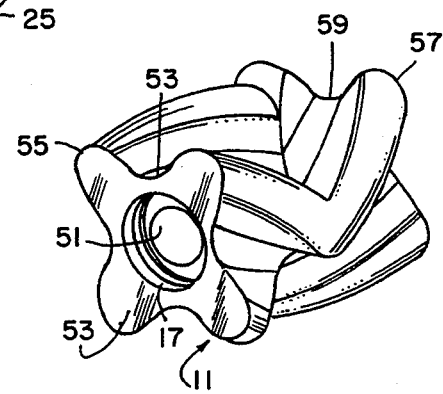
FIG. 8 is a perspective detail of the rotor.
Figure 9:
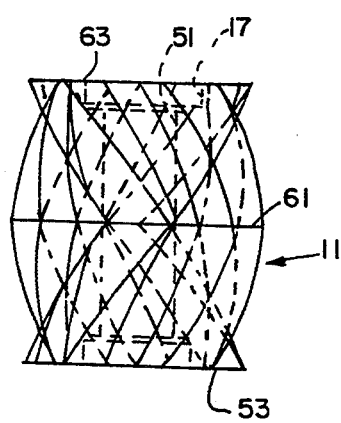
FIG. 9 is a plan view of the rotor.
Figure 10:
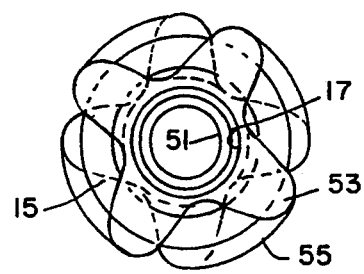
FIG. 10 is an end view of the rotor.

The preferred shapes of the rotors 11 and 13 are shown in FIGS. 8–10. The rotor 11 has an axially extending opening 51 which receives shaft 19, and counter bores 17 which receive and hold bearings for rotating on the fixed shafts. The double helical rotor has four lobes, which are shown at end faces 53. Each lobe has a continuous tip 55 and a valley 53, which merge with tips 57 and valleys 59 extending inward from the opposite end's faces.

The mergers of the tips and valleys occurs at a central line 61, which is midway between the faces 53 and 63 of the rotor 11.

The unique double helical rotors of the present invention have large pockets 15 which permit high flow at low RPM's. The reduced speed and the axial balance that the double helical rotors produce provides low wear, long life and low noise of the flowmeter. The rotor structure provides low pressure drops, so that potentially the flowmeter can be used with all fluids, viscous or low viscosity liquids, or even gases. While the rotors have been shown with counter bores for holding bearings on fixed shafts, the rotors and flowmeter may be constructed in a bearingless configuration. The rotors may be allowed to float within the cavity as they turn, controlled only by the complementary geometry of the rotors and the cavity. Alternatively, blind bores in ends of the rotors receive stub shafts which extend inward from flat surfaces of the cavity and cover.

In the drawings, the rotors are shown made out of metal so that ends of lobes may be sensed by a Hall effect pickup in the recess in the outer flat wall at the end of the casing. Alternatively, the rotors may be made of engineered thermoplastics, and magnetic targets may be implanted in sides of the rotor tips or in the hub of the rotor or rotors.

In one form of the invention, magnets may be implanted near ends of the rotors for coupling with magnets in indicator shafts mounted in and extending outward from hollow stub axles on which the rotors are supported. The rotors may be spaced from the end walls with thin boundary layer spacers to permit and predictably and precisely control leakage of the measured fluid around the end walls.

While the invention has been described with reference to specific embodiments, modifications and variations of the invention may be constructed without departing from the scope of the invention, which is defined in the following claims.

I claim:

1. Flowmeter apparatus, comprising a case having a cavity, intermeshing double helical rotors mounted for rotation within the cavity and a cover closing the cavity and holding the rotors within the cavity, the cavity having an inlet at one side and an outlet at an opposite side for flowing fluid into the cavity through the inlet and around the meshing double helical rotors and out of the cavity through the outlet, and a sensing device mounted on the case or cover for sensing rotation of the double helical rotors.

2. The apparatus of claim 1, wherein each of the rotors has two or more double helical lobes.

3. The apparatus of claim 2, wherein each of the rotors has a large volume transfer pockets alternately in communication with the inlet port, in isolation from the inlet and outlet ports, and communication with the outlet port.

4. The apparatus of claim 1, wherein the inlet and outlet are sufficiently large as not to be closed by passing tips of the rotors.

5. The apparatus of claim 4, wherein axles extend through the rotors and are fixed in the case and/or cover, or both, and wherein ends of the rotors have recesses for receiving bearings fitted around the axles.

6. The flowmeter apparatus of claim 1, wherein inlet and the outlet are stepped to receive an inlet pipe and an outlet pipe respectively.

7. Flowmeter apparatus, comprising a case having a cavity, intermeshing double helical rotors mounted for rotation within the cavity and a cover closing the cavity and holding the rotors within the cavity, the cavity having an inlet at one side and an outlet at an opposite side for flowing fluid into the cavity through the inlet and around the meshing double helical rotors and out of the cavity through the outlet, and a sensing device mounted on the case or cover for sensing rotation of the double helical rotors, wherein each of the rotors has two or more double helical lobes and large volume transfer pockets alternately in communication with the inlet port, in isolation from the inlet and outlet ports, and in communication with the outlet port, and wherein the high volume transfer pockets have curved surfaces which slope inward from axial outer surfaces of the rotors toward an axial center of the rotors.

8. Flow meter apparatus comprising a housing, two intermeshing double helical rotors rotatable in the housing, the double helical rotors having plural lobes extending generally helically and axially from central sections between axial ends of the double helical rotors, the lobes engaging with lobes from intermeshing double helical rotors near a center of the housing, and the lobes extending to internal walls of the housing, the double helical rotors having pockets between the lobes for transporting fluid in measurable quantities through the flowmeter and a means for sensing rotation of the double helical.

9. The flowmeter apparatus of claim 7, wherein the housing further comprises a cavity adapted for closing at opposite axial ends and having semi-cylindrical walls spaced apart by parallel walls with the rotors rotatable in the cavity, inlet and outlet ports in opposite parallel walls of the cavity for flowing fluid into the cavity and outwardly around the rotors and along the cylindrical walls and out of the cavity, and a sensor for sensing turning of the rotors within the cavity.

10. The flowmeter apparatus of claim 9, wherein the inlet and outlet ports are large ports which extend for substantial distance along the parallel walls between the semicylindrical walls and the ends.

* * * * *